Jan. 3, 1967

N. J. ALLBRIGHT ETAL
SEMI-CONTINUOUS CLOSED CIRCUIT APPARATUS
FOR RENDERING ANIMAL MATTER 3,295,929

Original Filed March 24, 1958

INVENTORS
NORMAN J. ALLBRIGHT
ALVYN C. BOLDON by: Fred Gerlach
ATTY.

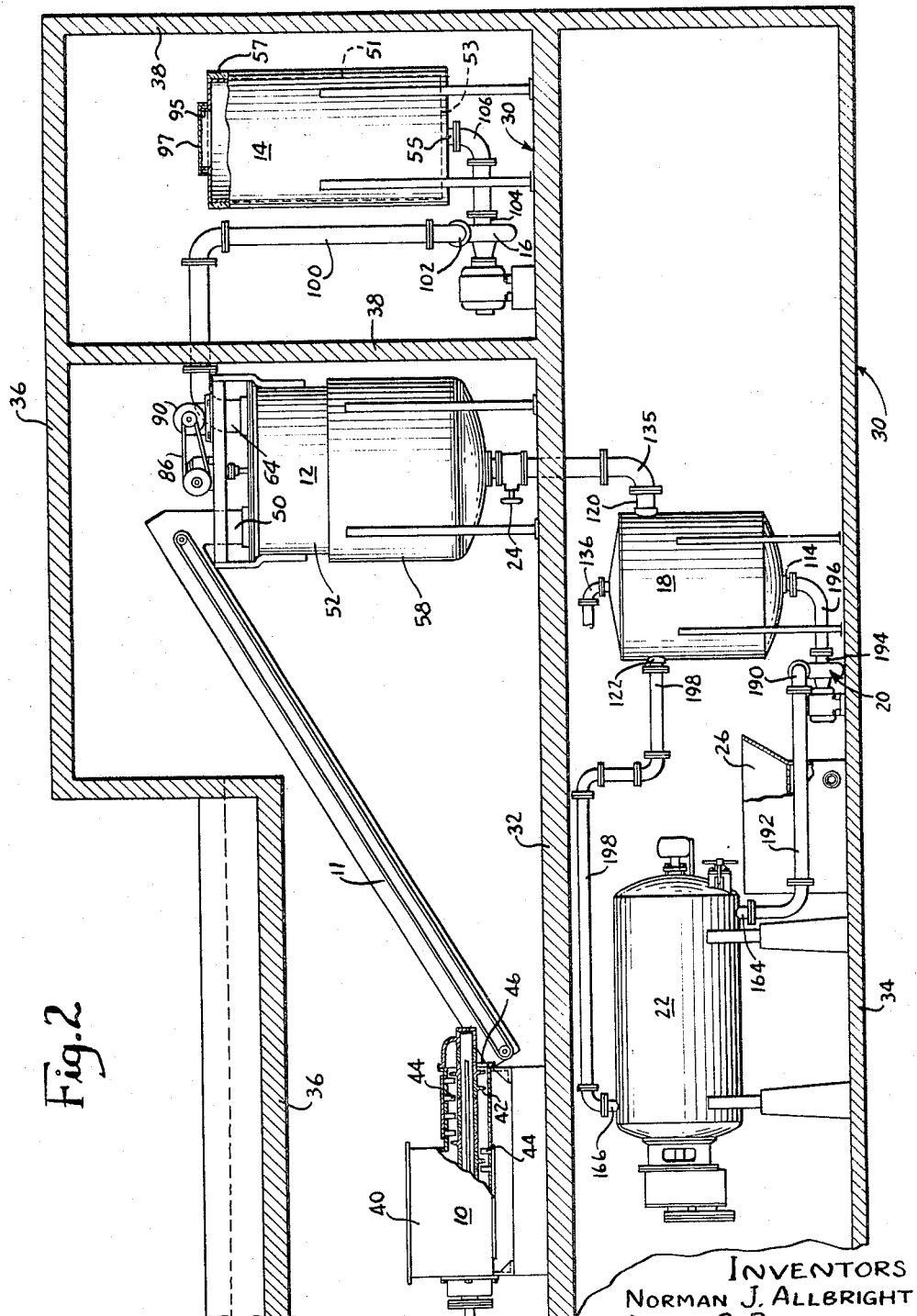

Jan. 3, 1967 N. J. ALLBRIGHT ETAL 3,295,929
SEMI-CONTINUOUS CLOSED CIRCUIT APPARATUS
FOR RENDERING ANIMAL MATTER
Original Filed March 24, 1958 3 Sheets-Sheet 3
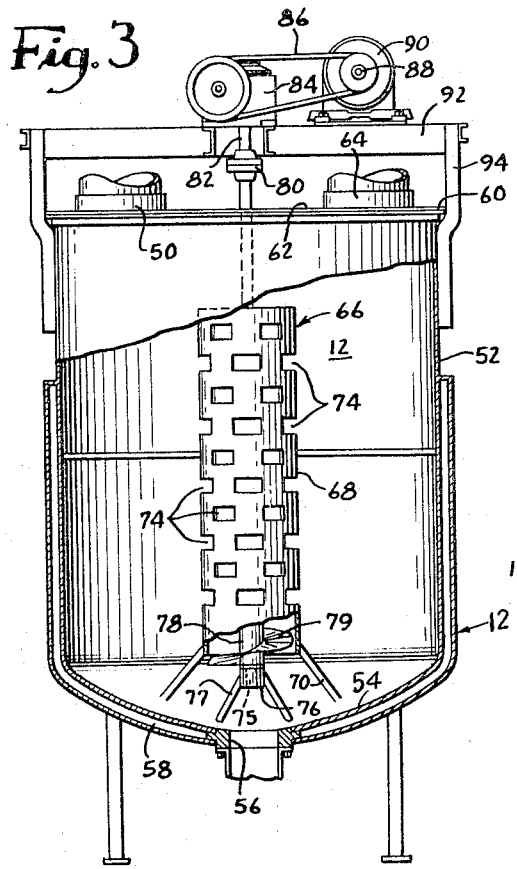
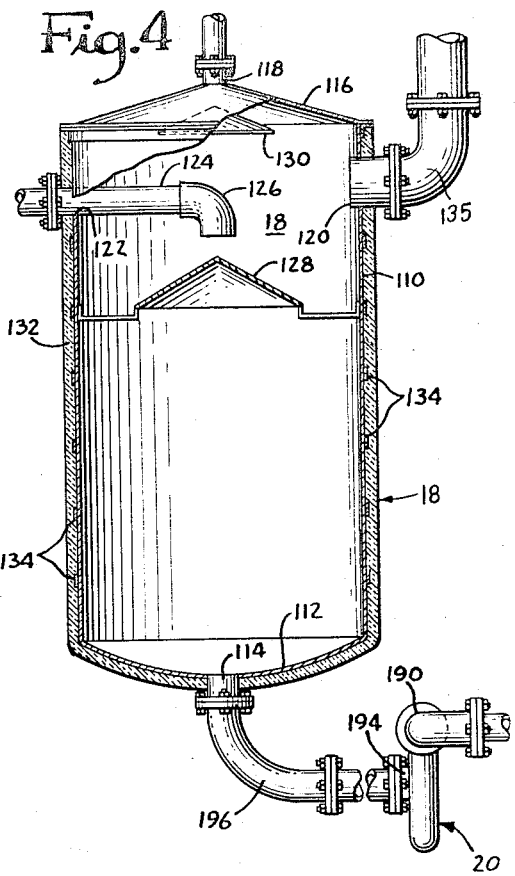
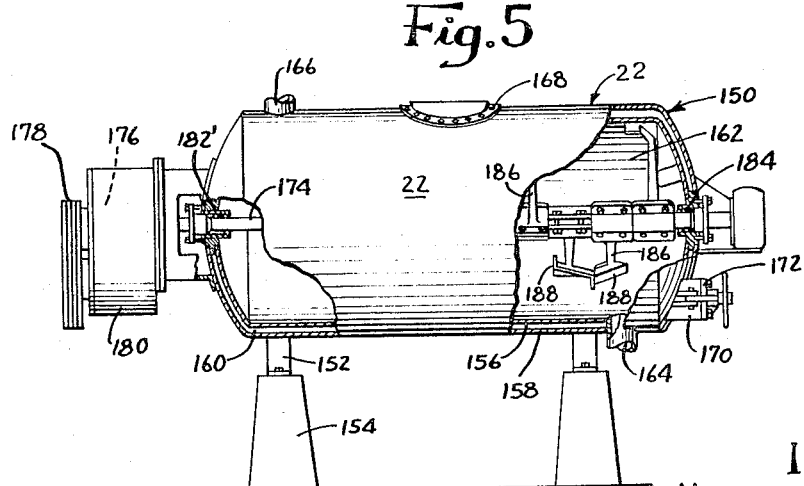
INVENTORS
NORMAN J. ALLBRIGHT
ALVYN C. BOLDON
by: Fred Gerlach
ATTY.

3,295,929
SEMI-CONTINUOUS CLOSED CIRCUIT APPARATUS FOR RENDERING ANIMAL MATTER
Norman J. Allbright, Hinsdale, Ill., and Alvyn C. Boldon, % Faber Industries, Inc., 109 S. Monroe St., Peoria, Ill.; said Allbright assignor to said Boldon
Continuation of application Ser. No. 723,472, Mar. 24, 1958. This application Jan. 18, 1962, Ser. No. 167,125
4 Claims. (Cl. 23—280)

This patent application is a continuation of our application Serial No. 723,472, filed on March 24, 1958, and now abandoned.

The improved rendering apparatus comprising the present invention has been designed for use primarily in connection with the rendering of inedible animal products, butchers' bones and fats, fallen animals, poultry offal, feathers, hide trimmings, hog hair and the like. The invention is, however, capable of other uses and may, with or without appreciable modification, be employed for rendering edible animal products, such as various parts from freshly slaughtered carcasses. Irrespective of the particular use to which the present invention may be put, the essential features of the invention are at all times preserved.

In the rendering of animal products, regardless of whether inedible or edible, the principal function of any rendering system is to separate the free fats from the other products in such a manner that the quality of the separated fats is preserved. To attain this function, utilizing a conventional batch process of dry rendering employing a rendering cooker, careful control of the process is necessary and this control can only be attained by constant attention being given the process from the time each batch is introduced into the cooker until cooking has been completed. The driving off of moisture is always a function of a rendering cooker and the amount of moisture driven off may vary approximately from 10% to as high as 75% so that loss of moisture during the rendering process reduces the overall content of the cooker. Due to the relatively high temperatures involved and the length of cooking time required, such loss of moisture and resultant reduction in content frequently lead to burning or scorching of the contents of the cooker so that the rendered product, in the case of edible products, is off-color or otherwise injured and, in the case of edible products, is, additionally, subject to objectionable taste characteristics.

The present rendering system is designed as an improvement over a conventional batch process of rendering and, toward this end, it contemplates the provision of a semi-continuous system by means of which the materials undergoing treatment or processing are rendered in a conventional cooker which is of slightly modified construction and constitutes one element or unit of the system, the process involved being such that evaporation of moisture is, in the main, caused to take place exteriorly of the cooker from material which has already been treated in the cooker and discharged therefrom to the region of evaporation, such discharge of the material from the cooker for evaporation purposes being accompanied by immediate replacement of the discharged material with substances to be further rendered so that the cooker at all times remains full. By thus maintaining the cooker entirely full during rendering operations, the danger of burning or scorching of the product is obviated. Additionally, for reasons that will be made clear presently, cooker-rendering may be effected at lower temperatures with the result that the products being rendered are never overcooked.

Stated in somewhat different terms, conventional batch rendering operations involving a conventional cooker are predicated upon the treatment to completion of a fixed and given quantity of the raw materials. This fixed quantity of material is introduced into the cooker at the outset and the thus charged cooker is set into operation and maintained in operation on the original charge until such time as cooking operations are completed, at which time the entire contents of the cooker are emptied and separation of the grease from the cracklings takes in a conventional crackling pan. The cooker is again charged and the operation repeated. During such treatment of any given batch of material, no further material is introduced into the cooker and evaporation takes place while the material is in the cooker so that the volume of the cooker contents is progressively decreased and temperatures progressively rise so that batch-concentration, coupled with high heat, gives rise to the danger of overcooking and scorching and, in addition, the accumulation within the cooker of carbonaceous deposits which must be removed before a new batch of materials to be rendered can be introduced into the cooker.

The present invention obviates the above-noted limitations that are attendant upon conventional batch processes or methods of rendering and it involves an apparatus or system which contemplates as one of the principal features thereof the initial addition of a relatively large percentage of prerendered grease from a previous process to a given batch of material to be rendered, with the added grease serving the twofold function of, first, making the entire batch entirely fluid with a low viscosity so that the batch may be caused to cycle in a closed circuit through the various component units of the system including the cooker and, secondly, maintaining a high grease content throughout the cycling materials, including the material contained within the cooker at any given instant, so that localized concentration of the product solids in the cooker will not take place. The absence of a high product concentration in the cooker, coupled with the fact that the cooker is maintained full at all times during cooking operations, eliminates the danger of overcooking, scorching or burning of the product.

The provision of a system or apparatus of the character briefly outlined above being among the principal objects of the present invention, a further object is to provide a rendering system or apparatus which is comprised largely of conventional rendering equipment, capable of being purchased on the market and assembled into a complete operative rendering apparatus by means of which the principles of the invention may be practiced, with a minimum of special manufactured units being involved.

Another object of the invention is to provide a rendering apparatus or system which is of a semi-automatic or semi-continuous character and in which, although batch operations are involved, the total volume of each batch before treatment is not limited to the cubic capacity of the cooker as is the case in conventional batch operations but may be appreciably greater in volume than the cubic capacity of the cooker to the end that, after the required amount of moisture has been driven off from the batch materials, the cooker remains filled with the treated or cooked product and, upon emptying thereof a materially greater volume of cracklings and free grease is discharged to the crackling pan than heretofore.

A still further object is to provide a rendering apparatus wherein, over any given run and after an initial batch of the raw materials has been treated, the grease additive for the process, as outlined above, is derived solely from the materials undergoing treatment so that no extraneous additives are required.

Yet another object of the invention is to provide a rendering apparatus or system which is semi-automatic to the extent that rendering of the materials may be conducted on a continuous basis, utilizing successive batches which are derived from the raw materials at a prebreaker stage with the materials being introduced into the apparatus automatically and batch control taking place by the simple expedient of valve manipulation and electric control of certain material impelling devices, such as a charging conveyor and various material-moving pumps.

A further object of the invention is to provide an improved rendering apparatus or system wherein the component operative parts or units which cooperate to make up the apparatus or system may be arranged so that the flow of material from one unit to the next succeeding unit may take place by gravity, thus eliminating the use of a material-moving pump or the like at the particular involved region of the apparatus and, as a consequence, reducing the amount of power consumed in operating the apparatus. In carrying out this last mentioned object, gravity flow of the materials is enhanced by the addition of pre-rendered grease to the various material batches, the grease having a lubricating, as well as a diluent effect on the material or materials to be rendered, so that free flow thereof may be attained, in addition to the fact that the additive grease is employed as a medium for maintaining the cooker at all times filled as previously outlined. The addition of free grease to the materials undergoing rendering has a further advantageous function in the operation of the apparatus in that it renders movable materials which, due to the presence of large bodies or chunks of solid materials such as may issue from the prebreaker, would be otherwise immobile as pumpage.

A still further object of the invention is to provide a semi-continuous rendering apparatus or system wherein a conventional cooker is employed for actual cooking and rendering operations but in which cooking takes place during recycling of the materials undergoing rendering in a local closed hydraulic circuit including the cooker, and with any loss of volume which may take place in any given batch of material taking place in a flash tank exteriorly of the cooker instead of in the cooker itself, and with the replacement air which must, of necessity, enter the system to replace the driven off moisture remaining at all times confined within the flash tank so as not to detract from the contents of the cooker which is at all times maintained full.

The provision of a rendering apparatus or system which, for any given capacity of operation, involves a consolidation of various formerly separately practiced operations and thus requires a minimum of floor space; one which, from the initial treatment of the raw animal products in the prebreaker to the separation of the grease from the cracklings in the crackling pan, involves a minimum of manual labor or operations; one which is comprised of a minimum number of moving parts and, therefore, is unlikely to get out of order; one wherein the cooker involved need not be operated at maximum temperature or for prolonged periods of time for each given batch so that there is a reduction in wear and tear on this piece of equipment with materially less shut-down operations for cleaning or scouring purposes and the like; one in which the apparatus involved is rugged and durable and, therefore, is possessed of a relatively long life; one which involves closed circuit flow of materials so that there will be no escape of non-condensible gases except under the same controlled conditions that obtain in connection with standard dry rendering operations and which, therefore, will conform to public health requirements; and one which, otherwise, is well adapted to perform the services required of it, are further features which have been borne in mind in the production and development of the present invention.

In the accompanying three sheets of drawings forming a part of this specification, one illustrative embodiment of the invention has been shown.

In these drawings:

FIG. 1 is a schematic view in flow-sheet form illustration the movement of the materials in the present rendering apparatus;

FIG. 2 is a more detailed schematic view illustrating one operative exemplary physical arrangement of the various instrumentalities of the apparatus as installed in a typical rendering plant;

FIG. 3 is a side elevational view, partly in section, of a combined preheating and mixing device employed in connection with the present invention;

FIG. 4 is a side elevational view, partly in section, of a flash tank employed in connection with the invention; and FIG. 5 is a side elevational view, partly in section, of a rendering cooker employed in connection with the invention.

Referring now to the drawings in detail, and in particular to FIG. 1, wherein a schematic representation of the present rendering apparatus has been made, briefly, materials delivered to a conventional comminuting or disintegrating device 10 and comminuted or otherwise treated therein, are thereafter conducted from the discharge end of the device by means of an elevator or conveyor 11 to the upper end of a combined preheating and mixing device 12 where they are brought to a predetermined elevated temperature and are mixed with a quantity of free grease which is conducted from a heated storage tank 14 by means of a pump 16 and delivered to the upper end of the device 12. The resultant mixture is delivered by gravity to a flash tank 18 from whence it is drawn by means of a pump 20 and introduced into a cooker 22 at the bottom thereof and adjacent to one end of the same. The upper region of the cooker adjacent to the other end thereof communicates with the flash tank 18 and a valve 24 in the conduit leading from the device 12 to the flash tank 18 is capable of being closed to shut off the supply of mixed materials to the flash tank so that a closed circuit flow of material may take place in a local circuit including the flash tank 18, cooker 22 and the pump 20. The cooker 22 is adapted to discharge its contents, after treatment thereof, into a separation device pan 26 which may be in the form of a conventional crackling drain pan for separation of the free grease from the cracklings.

In FIG. 2 a typical installation, utilizing the equipment schematically portrayed in FIG. 1, has been shown in somewhat more detail. However, inasmuch as the various functional instrumentalities for both treating and conveying materials undergoing rendering may assume widely different forms while still performing the same essential functions in the apparatus, respectively, specific details of construction have been omitted and the disclosure of FIG. 2 remains to a large extent schematic.

The various units or devices briefly outlined above are adapted to be operatively installed in a building or other supporting structure, such as the building 30 of FIG. 2. The building may be provided with upper and lower floors 32 and 34, a roof 36 and vertical supporting posts 38. The comminuting or disintegrating device 10, the preheating and mixing device 12, the storage tank 14 and the pump 16 may be operatively supported on the upper floor 32, while the flash tank 18, cooker 22 and pump 20 may be similarly operatively supported on the lower floor 34. It will be understood, of course, that any desired arrangement of the functional instrumentalities which comprise the present apparatus may be resorted to and that single level or tri-level supporting structures are contemplated. However, by use of the bi-level building 30 shown in FIG.

2, certain gravity feed operations which will be described in detail hereafter may be effected to eliminate pumping equipment and to attain other advantages which will appear as the following description ensues.

The comminuting or disintegrating device 10 may assume various forms but for purposes of illustration herein a conventional prebreaker having a receiving hopper 40 and internal comminuting mechanism including rotary hammers 42 and stationary anvils 44 may be employed. For a detailed description of a suitable prebreaker capable of performing the functions required of it in the present rendering apparatus, reference may be had to United States Patent No. 2,738,932, granted on March 20, 1965, and entitled "Preliminary Disintegrating Machine Particularly Adapted To Size Reduce Wood Blocks, Rubber Tires and the Like." The device 10 may be provided with a suitable orifice plate 46 for limiting the particle size at the output of the device. An electric motor 48 may be employed for driving the device 10.

The conveyor 11 is of conventional design and may be of the inclined endless belt type. The lower receiving end of the conveyor 11 is disposed beneath and adjacent to the discharge end of the device 10 so that the material issuing from the orifice plate 46 will fall by gravity onto the conveyor and be conducted upwardly therealong. The upper discharge end of the conveyor 11 communicates with the inlet opening 50 of the preheating and mixing device 12.

The storage tank 14 may be of conventional design and, as shown in FIG. 2, comprises a cylindrical shell 51 having a bottom wall 53 with a centrally disposed discharge outlet 55. The tank shell 51 is insulated by a covering 57 of insulating material. The contents of the tank 14 are adapted to be heated in any suitable manner as, for example, by submerged steam heating coils or by means of an electrical resistance heating unit electrically connected to a suitable source of energizing current.

The preheating and mixing device 12 which, as previously described, is adapted to receive the comminuted material from the conveyor 11 and a quantity of prerendered grease from the storage tank 14 has been shown in some detail in FIG. 3. The device is in the form of a cylindrical shell 52, the axis of which extends vertically. The lower end of the shell 52 is closed by a bottom wall 54 having a discharge opening 56 formed centrally therein. The lower region of the shell 52 is steam-jacketed as at 58 in order that heat may be applied exteriorly to the shell to raise the contents to a desired predetermined temperature for purposes that will be made clear presently. The upper open rim 60 of the shell 52 is closed by means of a top wall 62 in which the inlet opening 50 is formed. The inlet opening 50 is preferably formed adjacent to the periphery of the top wall 62 and a second and similar inlet opening 64 for the introduction of prerendered grease into the device 12 is provided in the top wall 62 at a region diametrically opposed from the inlet opening 50.

In order to agitate and mix the heated materials within the device 12, an agitator assembly designated in its entirety by the reference numeral 66, is disposed centrally within the device, and includes a vertically disposed perforate conveyor tube 68 which is open at its top and bottom and is maintained coaxially centered within the shell 52 by means of various strut-like supports 70. Rectangular perforations or openings 74 are formed in the tube 68 for a purpose that will be made clear presently. Pivoted as at 75 in a bearing 76 on supports 77 is a shaft 78 carrying a screw conveyor 79. The shaft 78 extends upwardly through the tube 68 and has its upper end operatively connected by a coupling 80 to the output shaft 82 of a gear reduction unit 84. The gear reduction unit 84 is operatively connected by a belt and pulley arrangement 86 to the drive shaft 88 of an electric motor 90. The motor 90 and gear reduction unit 84 are operatively mounted on a superstructure 92 which is carried on structural supporting members 94 on the shell 52. The shaft 78 is adapted to be rotated in a direction to cause the screw conveyor 79 to feed the material upwardly through the tube 68. To avoid needless repetition of description, the detailed operation of the combined preheater and mixing device 12 described above will be set forth subsequently when the operation of the entire rendering apparatus is explained.

The inlet opening 64 of the combined preheating and mixing device 12 is operatively connected through a composite conduit system 100 of individual pipes to the discharge side 102 of the pump 16. The inlet side 104 of the pump 16 is connected through a composite conduit 106 to the discharge outlet 55 of the storage tank 14. The storage tank 14 may be of any suitable design and is illustrated herein as being of the conventional cylindrical shell type having a filling opening 95 with a removable cover plate 97.

The flash tank 18 comprises a cylindrical shell 110 having a bottom wall 112 provided with a discharge outlet 114. The upper open rim of the shell 110 is closed by a cover plate 116 having a vapor outlet 118 formed centrally therein. A side inlet opening 120 adjacent to the top or upper end of the shell 110 is provided for introduction of the heated raw material issuing from the preheating and mixing device 12. A second side inlet opening 122 is provided adjacent to the upper regions of the shell 110 and is diametrically opposed to the inlet opening 120. An inlet pipe 124 extends through the opening 122 in sealed relationship with respect thereto and carries at its end an elbow 126 which is disposed above and in opposition to a spreader and flash cone 128. The latter is centered within the shell 110 and is suitably supported thereon. The inlet pipe 124 is connected to the cooker 22 for recycling of the materials undergoing cooking in a manner that will be described presently. A baffle plate 130 of cone-shape configuration is suspended from the cover plate 116 below the vapor outlet 118 and is provided for the purpose of preventing fine solids from being drawn through the outlet 118 under the influence of sub-cooker pressure. The shell 110 is provided with a relatively heavy jacket 132 of insulation and a series of reinforcing bands 134 surround the tank shell 110 at various levels and are welded or otherwise secured thereto to prevent collapse of the shell under the influence of sub-cooker pressure.

The inlet 120 of the flash tank 18 is connected to the discharge opening 56 of the preheating and mixing device 12 by means of a conduit 135 including suitable pipe sections operatively connected to one another. The previously mentioned valve 24 is interposed in the conduit 135 and constitutes a shut-off valve for stopping flow of the material from the device 12 to the flash tank 18 for a purpose that will be made clear subsequently. The vapor outlet 118 may be operatively connected through a conduit 136 to the suction side of a pump 138 by means of which the interior of the tank 18 may be maintained at sub-atmospheric pressure.

The cooker 22 is of the general type which is shown and described in United States Patent No. 2,673,790, granted on March 30, 1954, and entitled "Rendering Cooker." It has, however, been modified to adapt it to semi-continuous cooking operations as will be described presently instead of batch cooking operations as described in said patent. The structural details of the cooker 22 have not been fully illustrated herein inasmuch as they are substantially identical with the structural details of the cooker shown in aforementioned Patent No. 2,673,790 and reference may be had to this patent for a full understanding of these details. It is deemed sufficient for purposes of illustration herein to describe only the essential elements of the cooker 22 as they are pertinent to the present invention. The cooker 22 comprises a shell 150 of cylindrical configuration and the axis of which extends horizontally. The shell 150 is supported in an elevated position over the lower floor 32 on cradles 152 which are carried on pedestals 154. The shell 150 is of a composite nature and includes inner and outer shell sections 156 and 158 which define therebetween a steam jacket 160 for effecting high pressure cooking of the material in circulation through the interior of the shell chamber 162. It will be understood, of course, that steam is continuously circulated through the jacket 160 by way of inlet and outlet openings (not shown). The material which is pumped from the flash tank 18 is introduced into the interior of the cooker shell 150 through an inlet opening 164 at the bottom of the shell and adjacent to the right hand end thereof as viewed in FIG. 5. The shell 150 is adapted to be completely filled with the material undergoing rendering at all times during the cooking operation and embodies an outlet opening 166 at the top thereof and adjacent to the left-hand end of the same. In connection with operation of the apparatus, the material is recycled through the cooker 22, flash tank 18 and pump 20. Since the material is, during actual cooking operations, pumped continuously into the interior of the shell 150 through the inlet opening 164, the outlet opening 166 may be regarded as an overflow opening for the cooker. The usual charging dome associated with cookers of this type has been omitted and the opening ordinarily associated with such domes is closed by means of a plate 168. A tubular member 170 projects through the right hand end wall of the shell 150 and defines a discharge opening by means of which the entire contents of the cooker 22 may be emptied into the pan 26. A hinged door 172 in associated relation with the tubular member 170 maintains the shell 150 closed while the material is being rendered or digested during its circulatory passage through the cooker.

The cooker 22 is provided with a horizontal agitator shaft 174 which extends longitudinally through the central regions of the shell 150 and is adapted to be driven in either direction by power mechanism including a reversible electric motor 176 which operates through a belt and pulley connection 178 and gear reduction device 180 to drive the agitator shaft 174. The agitator shaft 174 is rotatably mounted in sealed bearings 182 and 184 at the opposite ends of the shell 150 and is provided with the usual series of longitudinally spaced impeller paddles 186 carrying deflector blades 188 at the distal ends thereof. The deflector blades 188, during normal operation of the cooker, serve to impel the material in the cooker from right to left as viewed in FIG. 5, i.e., from the inlet opening 164 toward the outlet opening 166. When the direction of the motor 176 is reversed, these deflector blades will serve to "back up" the material in the cooker for discharge thereof through the tubular member 170 at the end of any given cycle of operation when cooking operations are completed for purposes that will be made clear subsequently.

The inlet opening 164 of the cooker 22 is operatively connected to the discharge side 190 of the pump 20 through a conduit 192 and the inlet side 194 of the pump is operatively connected to the discharge outlet 114 of the flash tank 18 by a conduit 196. A conduit 198 operatively connects the discharge opening 166 of the cooker 22 to the inlet opening 122 of the flash tank 18. As shown in FIGS. 1 and 2 of the drawings, the inlet opening 122 of the flash tank is at a lower elevation than the outlet opening 166 of the cooker 22 and, consequently, in connection with operation of the apparatus, a siphon action occurs in the aforementioned conduit 198.

The rendering method which is made possible by the apparatus described above has been referred to herein as being semi-continuous in its operation. Such appellation is predicated upon the fact that predetermined quantities of loads of the material are made up in the correct proportions from materials issuing from the disintegrating device 10 and withdrawn from the storage tank 14, are thoroughly mixed and heated in the preheating and mixing device 12, and are delivered from this latter component of the apparatus to a closed-circuit treatment phase wherein the materials are "cooked" and thus rendered to completion by a recycling operation involving the flash tank 18, pump 20 and cooker 22, after which the rendered materials are emptied from the closed-circuit treatment phase for separation of the grease and cracklings. During such recycling operations on any given load of the material, the next succeeding load is undergoing the necessary preparatory preheating and mixing treatment prior to introduction to the closed-circuit phase when the latter has been emptied of its contents.

Although installations involving the present rendering apparatus may be designed for a wide range of capacities, the relative sizes of the various operative material-containing storage and treatment components of the apparatus will remain proportionately unchanged. Assuming, for purposes of illustration, that the preheating and mixing device 12 has a capacity of 12,000 pounds, the storage tank 14 may have a capacity of 4000 pounds so that when its contents are emptied into the device 12, the disintegrating device 10 will be required to furnish 8000 pounds of raw materials if the device 12 is to be filled to capacity. The cooker 22, flash tank 18 and pump 20 are designed to handle for recycling purposes the entire contents of the preheating and mixing device 12 and, thus, a standard type of cooker having 8000 pounds capacity may be modified according to the present invention and utilized in the closed-circuit recycling phase in combination with a flash tank having a capacity of 4000 pounds. Although the pump 20 and material conduits 196, 192, 198 will be filled during recycling operations with the materials undergoing rendering, the capacities of these conduits may be disregarded, inasmuch as, although the quantities of material involved are not negligible, the flash tank 18 is capable of operation at capacities somewhat above or below its rated 4000 pounds capacity.

In the operation of the apparatus, the storage tank 14 will be initially filled with fresh grease or with grease derived from a previous process according to the present apparatus. The heating means for the tank 14 will then be energized and the contents of the tank 14 brought to the required temperature which may be on the order of 185° F. When the grease in the tank 14 has attained the proper temperature, the pump 16 will be operated and the heated grease pumped from the tank 14 into the preheater and mixing device 12 through the filling opening 64 by way of the conduit 106, pump 16 and conduit 100. Simultaneously with the introduction of grease into the device 12, or separately therefrom, if desired, the requisite quantity of raw material may be fed to the device 12 through the filling opening 50 by way of the conveyor 11. During the filling operation, the motor 90 is energized so as to cause rotation of screw conveyor 79 of the agitator assembly 66 while, at the same time, steam is supplied to the steam jacket 58 so that the contents of the device 12 undergoing mixing will be brought to a predetermined temperature, for example 185° F., and maintained at such temperature until the mixing operation is complete. The function of the grease which is supplied to the device 12 for mixture with the raw materials issuing from the conveyor 11 is to afford good lubricating qualities to the mixture so that it will be capable of flowing in the recycling circuit during rendering operations, and also so that it may flow by gravity from the device 12 to the flash tank 18 immediately prior to the commencement of such recycling operations. As soon as the mixture in the preheating and mixing device 12 has reached the lowermost level of the feed screw 79, the material will be elevated within the tube 68 and allowed to flow outwardly through the various openings 74 in the tube as the tube gradually becomes filled due to a rise in the liquid level in the shell 52. When the shell 52 of the device 12 is substantially full, the action of the feed screw 79 will be to expel the material entering the lower end of the tube 68 outwardly through all of the various openings 74 with a fairly equal distribution of the material to all of the openings and with a small quantity of the material overflowing the upper rim of the tube. It will be understood, of course, that upon filling of the device 12, the pump 16 will be deenergized.

After thorough mixture of the materials in the preheating and mixing device 12, the valve 24 is opened and the contents of the device 12 will flow through the conduit 135 and enter the flash tank 18 through the inlet opening 120. The capacity of the flash tank 18 is less than the capacity of the device 12 so that in order to prevent overfilling of the former it is necessary to energize the pump 20 prior to the filling operation so that a portion of the material will be sent to the cooker 22 by way of the conduit 196, pump 20 and conduit 192 to make room for further material coming from the device 12. With the pump 20 in operation during the time that filling operations are being carried out, the material will be distributed between the cooker 22 and flash tank 18 according to the capacities of these two instrumentalities and, when all of the material has been withdrawn from the preheating and mixing device 12, the cooker 22 will be completely full, while the flash tank 18 will be operating at approximately maximum capacity. At this time, the valve 24 will be closed so that the now empty preheating and mixing device will be ready to receive a fresh charge of the materials from the storage tank 14 and device 10 and filling operations toward this end may be commenced under the influence of the pump 16.

The materials contained in the closed circuit including the cooker 22, flash tank 18, pump 20 and the various conduits 196, 192 and 198, are allowed to circulate while the cooker 22 is set into full operation in the usual manner of operation of such cookers so that the recycling materials will be thoroughly rendered or digested with evaporation taking place in the flash tank 18 in the vicinity of the flash cone 128 under the influence of a relatively large drop in pressure as the materials enter the low pressure environs of the tank 18 at a temperature above the boiling point of the contained moisture.

When cooking operations are completed, and the desired quantity of moisture removed from the materials being rendered, the operation of the cooker 22 is stopped, after which the door 172 is opened and the material within the cooker 22 allowed to flow through the tubular member 170 into the pan 26 for separation of materials in the usual manner. The pump 20 may be allowed to continue its operation to pull the material in the flash tank 18 through the system and into the cooker until the contents of the system have been substantially discharged through the tubular member 170. The motor 176 of the cooker 22 is reversible and, in order to discharge the final quantity of material left within the cooker after the level of material within the same has dropped to such an extent that normal discharge operations cannot be continued, the motor is reversed so that the impeller paddles 186 will reverse the direction of material-flow in the cooker 22 and completely empty the same. It is to be noted that the chamber defined by the cooker has a relatively large volumetric capacity for retention therein as an undivided mass of a major portion of the heated flowable mixture in the closed circuit undergoing pumping. Because of the fact that the cross sectional area of this chamber, particularly in a horizontal plane at any given level of the chamber, is appreciably greater than the cross-sectional area of the fluid inlet 164 of the cooker, the material entering this inlet will diffuse and gradually rise vertically within the chamber in the form of a large, single, unobstructed, hydrostatic head for subsequent passage outwardly through the fluid outlet 166 of the cooker. Except for the action of the impeller paddles 186 which exert a relatively gentle agitating and impelling action on the mixture, the contents of the cooker chamber is relatively quiescent so that a certain amount of normal thermal heat distribution of the material in the chamber takes place. This localized thermal circulation of the material within the cooker is in a direction to assist the pumping action of the pump 20 which causes a gradual and even upflow of material through the chamber toward the overflow outlet 166.

The disposition of the materials discharged into the crackling pan 26 forms no part of the present invention but it will be understood that a portion of the separated grease may be conducted to the storage tank 14 and used for processing the next succeeding recyling batch. The operation of the system is repetitious.

The invention is not to be limited to the exact arrangement of parts shown in the accompanying drawings or described in this specification as various changes in the details of construction may be resorted to without departing from the spirit of the invention. For example, while the moisture-content of the materials undergoing rendering in the system have been described as being repeatedly subjected to cooking operations in the cooker 22 and moisture removal in the flash tank 18 by recirculation of these materials in a closed circuit path leading through these two instrumentalities, it is within the scope of the present invention to effect such repetitious moisture evaporation by passing the materials successively through a series of operatively connected alternately arranged cookers and flash tanks with the last cooker in the series discharging all of the materials to its associated crackling pan or other separation device. Only insofar as the invention has particularly been pointed out in the accompanying claims is the same to be limited.

Having thus described the invention what we claim as new and desire to secure by Letters Patent is:

1. An apparatus designed for use in rendering a predetermined quantity of animal matter and comprising a preheating and mixing tank adapted to receive said quantity of animal matter and a quantity of prerendered grease, means for applying heat to said tank to raise the temperature of the contents thereof, means for agitating the heated contents of the tank to produce a heated flowable mixture therein, a cooker comprising a normally closed horizontally elongated receptacle with a fluid inlet in the bottom region thereof and a fluid overflow outlet adjacent to the top region thereof, and also comprising a power-driven paddle-equipped shaft extending longitudinally through the central portion of the receptacle and means for supplying heat to the cooker in the form of a substantial continuous steam jacket around the receptacle, a flash tank having a fluid inlet at the upper region therein and a fluid outlet at its bottom region, a conduit establishing fluid communication between the fluid outlet of the cooker and the fluid inlet of the flash tank, a conduit establishing fluid communication between the fluid outlet of the flash tank and the fluid inlet of the cooker, said flash tank being provided at the top thereof with a vapor outlet for the escape of moisture, said cooker, flash tank and conduits comprising a normally closed fluid circuit through which said flowable mixture may be repeatedly circulated, a conduit establishing fluid communication between the preheating and mixing tank and the closed fluid circuit and serving to transfer said heated flowable mixture from the preheating and mixing tank to said closed fluid circuit for treatment therein, a shut-off valve connected in and forming a part of said last mentioned conduit, and power-driven impeller means connected to and forming a part of said closed fluid circuit and operative when driven while such shut-off valve is in its closed position repeatedly and continuously to cause the transferred mixture to circulate through said closed fluid circuit in such manner that during each cycle it flows from the lower portion of the flash tank to the cooker, then in a generally upward direction through the cooker and finally downwardly through the flash tank.

2. An apparatus as set forth in claim 1 and wherein the horizontally elongated receptacle of the cooker is devoid of prominent fixed internal baffles and fluid-restricting passages, the fluid inlet is located adjacent to one end of the receptacle, and the fluid outlet is located adjacent to the other end of the receptacle.

3. An apparatus as set forth in claim 1 and wherein the fluid inlet of the flash tank is at a lower elevation than the fluid outlet of the cooker in order that a siphon action occurs in the conduit between the cooker outlet and the flash tank inlet during operation of the apparatus.

4. An apparatus as set forth in claim 3 and wherein the power-driven impeller means is connected to the conduit between the fluid outlet of the flash tank and the fluid inlet of the cooker.

References Cited by the Examiner

UNITED STATES PATENTS

| 2,551,034 | 5/1951 | Merriman et al. | 23—280 |
| 2,673,790 | 3/1954 | Illsley | 23—280 |
| 2,748,152 | 5/1956 | Sifferd et al. | 260—412.6 |
| 3,057,699 | 10/1962 | Allbright et al. | 23—280 X |

MORRIS. WOLK, *Primary Examiner.*

JAMES H. TAYMAN, JR., *Examiner.*